(12) United States Patent
Tanami

(10) Patent No.: US 11,992,151 B2
(45) Date of Patent: May 28, 2024

(54) STEAM WAND TREATING DEVICE

(71) Applicant: Ori Tanami, Gedera (IL)

(72) Inventor: Ori Tanami, Gedera (IL)

( * ) Notice: Subject to any disclaimer, the term of this patent is extended or adjusted under 35 U.S.C. 154(b) by 1024 days.

(21) Appl. No.: 16/666,433

(22) Filed: Oct. 29, 2019

(65) Prior Publication Data

US 2021/0121002 A1  Apr. 29, 2021

(51) Int. Cl.
*A47J 31/60* (2006.01)
*A47J 31/44* (2006.01)
*B08B 9/023* (2006.01)

(52) U.S. Cl.
CPC ........ *A47J 31/60* (2013.01); *A47J 31/4489* (2013.01); *B08B 9/023* (2013.01)

(58) Field of Classification Search
CPC ........ A47J 31/60; A47J 31/4489; B08B 9/023
USPC .......................................................... 99/290
See application file for complete search history.

(56) References Cited

U.S. PATENT DOCUMENTS

| | | | | |
|---|---|---|---|---|
| 5,279,731 A | * | 1/1994 | Cook | B01D 29/21 210/489 |
| 5,330,266 A | * | 7/1994 | Stubaus | A47J 31/4485 99/323.1 |
| 2020/0113371 A1 | * | 4/2020 | Abbiati | A47J 31/4489 |

* cited by examiner

*Primary Examiner* — Phuong T Nguyen
(74) *Attorney, Agent, or Firm* — Rivka Friedman

(57) ABSTRACT

The present invention provides a device for treating a steam wand comprising: a gripping portion having at least one tube configured to transfer a treatment agent; a ring portion in communication with the gripping portion configured to encircle the steam wand and receive the treatment agent, the ring portion includes an inner ring and an outer ring defining a cavity containing a corrugated sheet; and, a plurality of apertures positioned on the inner ring configured to present the treatment agent onto the steam wand.

9 Claims, 6 Drawing Sheets

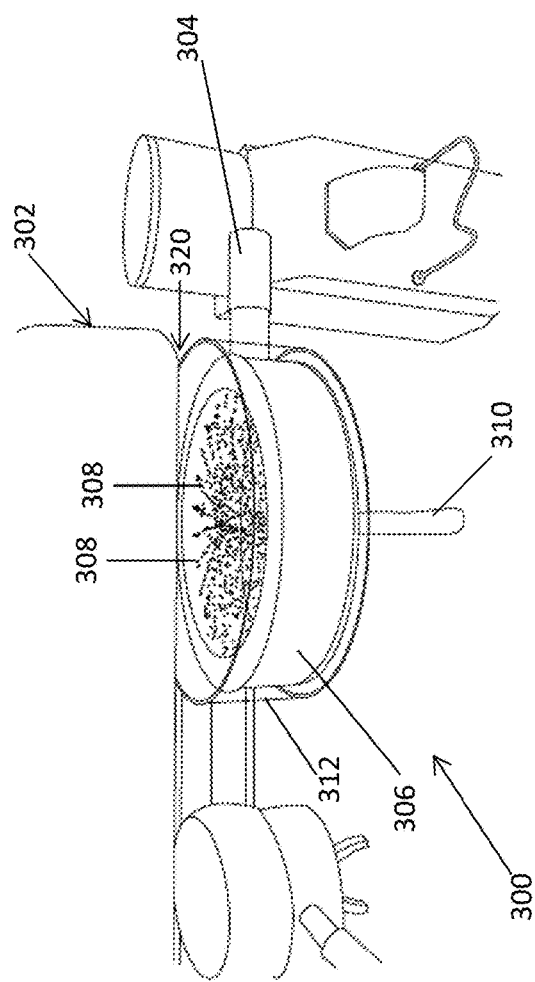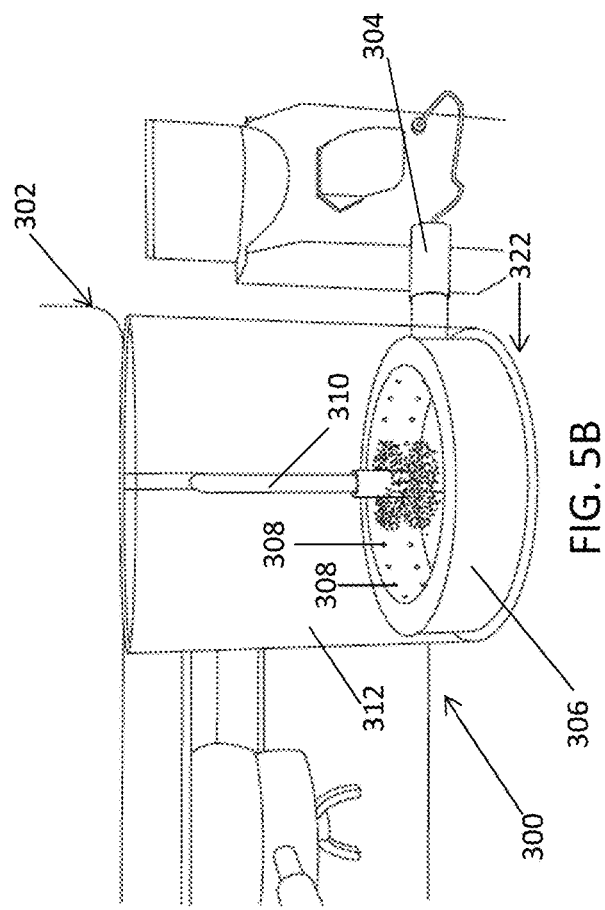

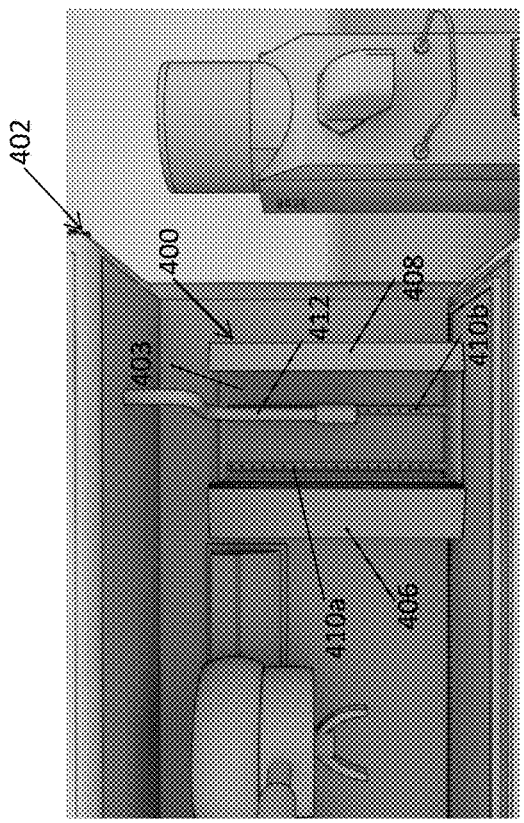
FIG. 6A
FIG. 6B
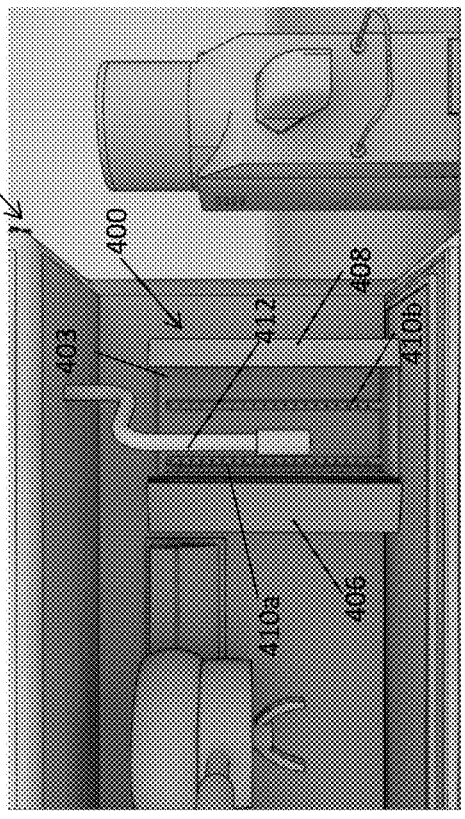
FIG. 6C
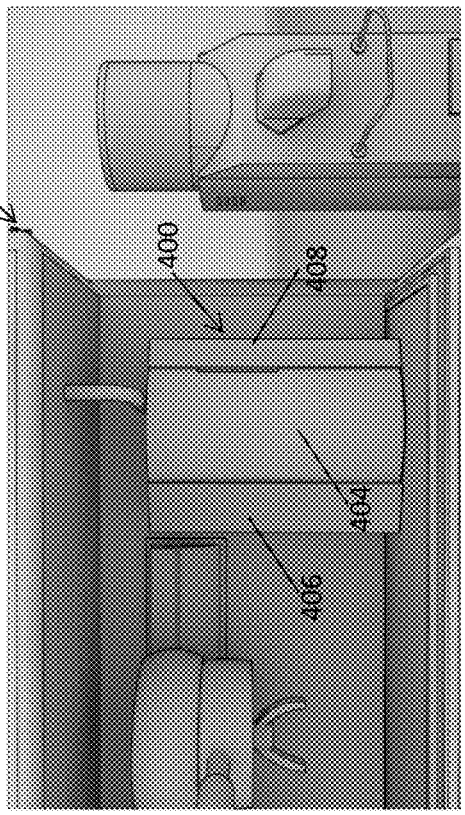
FIG. 6D

STEAM WAND TREATING DEVICE

TECHNICAL FIELD

The present invention is directed to systems for cleaning coffee machines in general and steam wands in particular.

BACKGROUND OF THE INVENTION

Coffee machines are cooking appliances used to brew coffee. While there are many different types of coffee machines using a number of different brewing principles, in the most common devices, coffee beans are placed in a paper or metal filter inside a funnel while boiled water from a separate chamber is poured into the funnel. As coffee machines developed, additional appliances have been added to the procedure of coffee making, such as a steam wand.

A steam wand is a device used to heat and froth milk that can be added on top of hot beverages. Even though steam wands are simple to use it can be a challenge to keep them hygienic, since milk residues often stick to them serving as a platform for the growth of bacteria.

SUMMARY OF THE INVENTION

The present invention provides a device for cleaning, disinfecting and sterilizing a steam wand using streams of water and/or steam. Embodiments of the invention are directed to a device for treating a steam wand comprising: a gripping portion having at least one tube configured to transfer a treatment agent; a ring portion in communication with said gripping portion configured to encircle said steam wand and receive said treatment agent, said ring portion includes an inner ring and an outer ring defining a cavity containing a corrugated sheet; and, a plurality of apertures positioned on said inner ring configured to present said treatment agent onto said steam wand.

Optionally, the at least one tube is controlled by a valve.
Optionally, the treatment agent is steam.
Optionally, the treatment agent is water.
Optionally, the ring portion includes a first ring portion and a second ring portion in communication with one another, said first ring portion configured to present a first treatment agent and said second ring portion configured to present a second treatment agent.

Optionally, the cavity includes a plurality of ring-shaped portions wherein every two ring-shaped portions of said plurality of ring-shaped portions include a corrugated sheet between them.

Optionally, the device is incorporated into a standard coffee machine.

Optionally, the device includes a crumpled sheet extending around said ring portion.

Embodiments of the invention are directed to a device for treating a steam wand comprising: a chamber having a rear wall, oppositely disposed lateral walls and a moveable door, said chamber is configured for receiving said steam wand; at least one set of apertures including a pattern of plurality of apertures configured to present said treatment agent onto said steam wand.

Optionally, the pattern of plurality of apertures includes apertures arranged in a column.
Optionally, the treatment agent is steam.
Optionally, the treatment agent is water.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIGS. 5A and 5B are perspective views of the device according to another embodiment of the present invention;

FIGS. 6A and 6B, 6C and 6D are perspective views of the device according to yet another embodiment of the present invention;

DETAILED DESCRIPTION OF THE DRAWINGS

The present invention is not limited in its application to the details of construction and the arrangement of the components set forth in the following description. The invention is capable of other embodiments, or of being practiced or carried out in various ways. Also, it is to be understood that the phraseology and terminology employed herein is for the purpose of description and should not be regarded as limiting.

The present invention refers to a steam wand treating device for cleaning, disinfecting and sterilizing a steam wand using streams of water and/or steam. The present invention prevents unwanted milk residues from sticking to the steam wand in addition to preventing the accumulation of bacteria on top of the steam wand.

Figure 1:
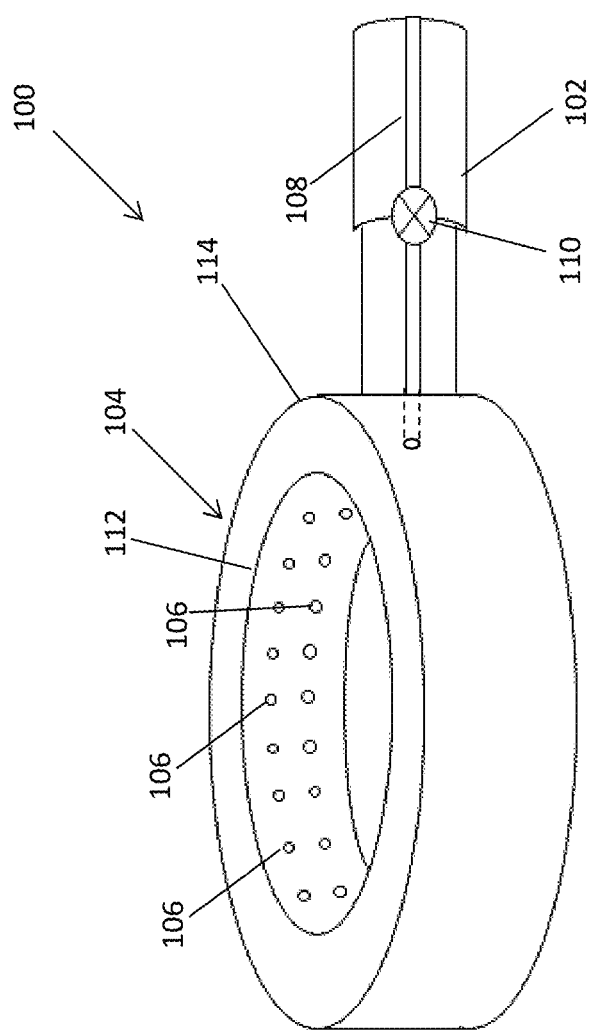
FIG. 1 is a perspective view of a device according to an embodiment of the present invention.

FIG. 1 is a perspective view of the steam wand treating device 100. The steam wand treating device 100 includes a gripping portion 102 connected to a ring portion 104 featuring a plurality of apertures 106 shaped to allow the exit of a treatment agent, for example, a fluid. The apertures 106 go along the entire inner circumference of the ring portion 104 in a symmetric pattern.

The gripping portion 102 contains a tube 108 connected to a coffee machine's fluid container (not shown) so as to transfer fluid, for example, water from the container into the ring portion 104. The tube is controlled by a valve 110, for example, a spring valve, a pressed valve, etc. positioned on the gripping portion 102. The valve 110 controls the passage rate of water passing from the gripping portion 102 into the ring portion 104.

Figure 2:
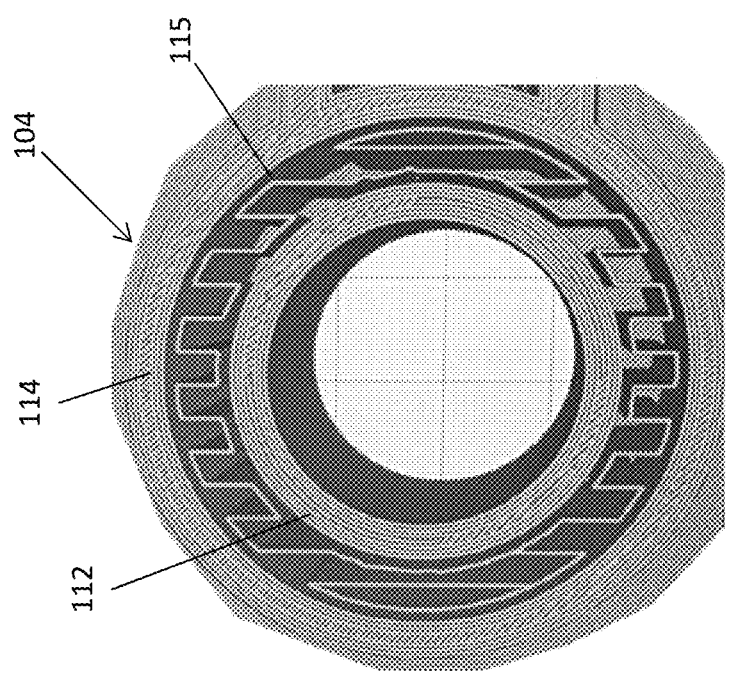
FIG. 2 is a cross sectional view of the ring portion of the device of FIG. 1.

The ring portion 104 includes a first inner ring 112 and a second outer ring 114 extending around the first inner ring 112 and defining a cavity. The cavity between the first and second ring portions includes, for example, a corrugated sheet 115 (best seen in FIG. 2) configured for imparting pressure, by generating sub-pressure, to fluid passing through the cavity.

The ring portion 104 may include a plurality of ring-shaped portions located between the second outer ring and the first inner ring such that every two ring-shaped portions of the plurality of ring-shaped portions include a corrugated sheet between them.

In operation, the ring portion 104 encircles, for example, a steam wand incorporated into a standard coffee machine such that the steam wand is at the center of the ring portion 104. Fluid passes through tube 108 from the coffee machine's fluid container to the gripping portion 102 and into the ring portion 104. The passage rate of the fluid is controlled by the valve 110.

As the fluid reaches the ring portion 104, it enters the cavity between the first inner ring 112 and the second outer ring 114. At the cavity, the corrugated sheet (FIG. 2) imparts pressure to the fluid, causing the pressurized fluid to exit through the plurality of apertures 106 onto the steam wand at the center of the ring portion 104. The pressurized fluid exiting the plurality of apertures 106 removes any unwanted milk residues that may be stuck to the steam wand. Lifting and lowering the steam wand treating device 100 along the steam wand, using gripping portion 102, ensures the full cleaning of any unwanted milk residues.

Figure 3:
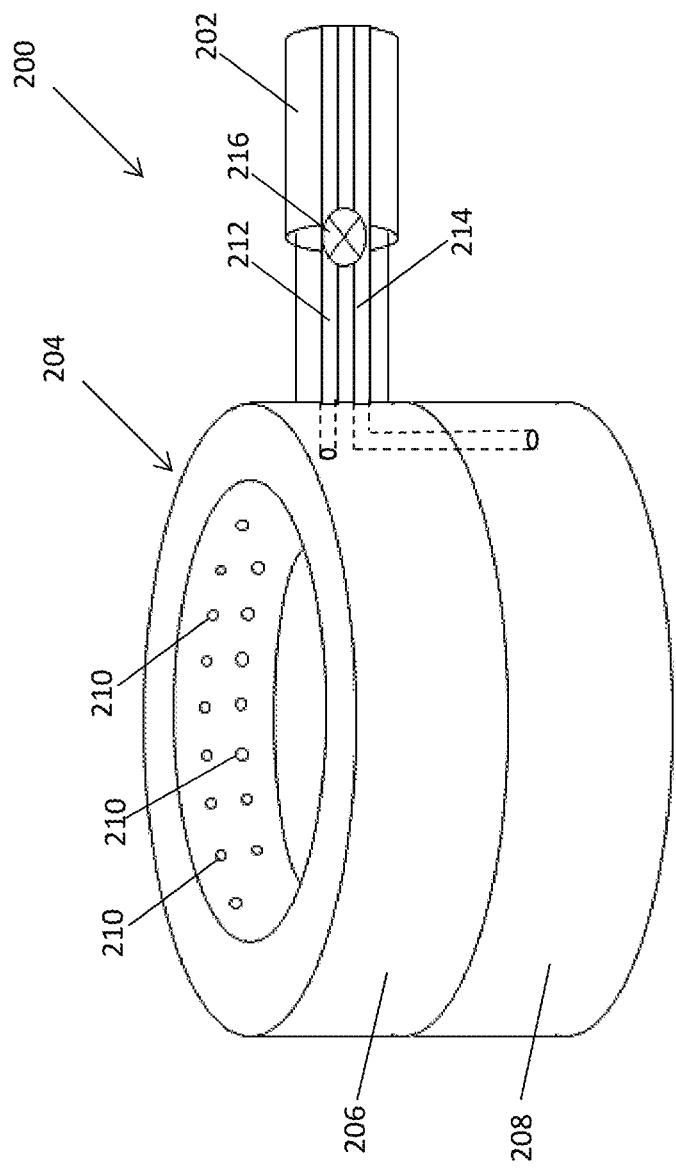
FIG. 3 is a perspective view of the device according to another embodiment of the present invention.

FIG. 3 is a perspective view of the steam wand treating device 200. The device 200 is similar in construction and operation to device 100, as detailed above, except where indicated. The steam wand treating device 200 includes a gripping portion 202 connected to a ring portion 204 having a first liquid ring portion 206 and a second steam ring portion 208 each featuring a plurality of apertures 210 shaped to allow the exit of a treatment agent, such as liquid and/or steam respectively. The apertures 210 go along the entire inner circumference of the first and second ring portions in a symmetric pattern.

Figure 4:
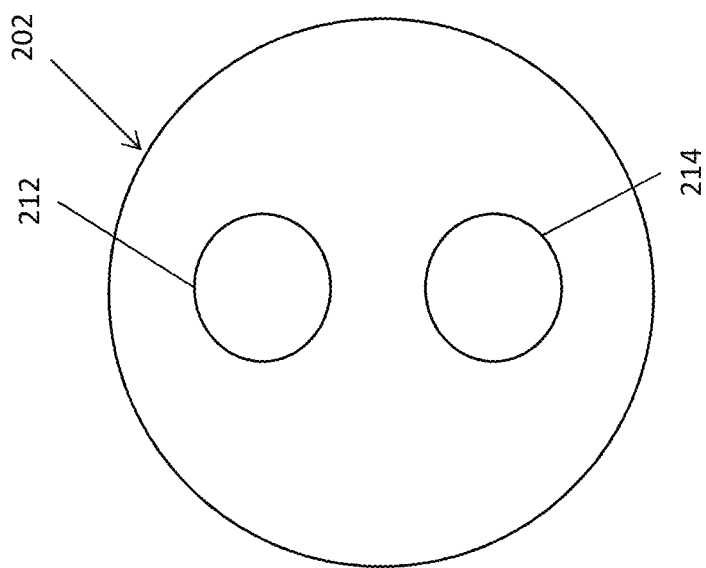
FIG. 4 is a cross sectional view of the gripping portion of the device of FIG. 3.

The gripping portion 202 includes a first tube 212 connected to a coffee machine's fluid container so as to transfer fluid, for example, water from the container to the first liquid ring portion 206, and a second tube 214 connected to the coffee machine's boiler so as to transfer steam, for example, water vapor from the boiler to the second steam ring portion 208 (FIG. 4). The tubes 212 and 214 are controlled by a valve 216, for example, a spring valve, a pressed valve, etc. positioned on the gripping portion 202.

Each of the first liquid ring portion 206 and the second steam ring portion 208 includes inner and outer ring portions defining a cavity, similar to those described for device 100, with a corrugated sheet positioned within the cavity configured for imparting pressure to a fluid or steam passing from the outer ring to the inner ring.

In operation, the ring portion 204 encircles, for example, a steam wand incorporated into a standard coffee machine such that the steam wand is at the center of the ring portion 204. Fluid and/or steam are transferred through tubes 212 and/or 214 respectively to the gripping portion 202 and into the ring portion 204. The passage rate of the fluid and/or steam is controlled by the valve 216.

As fluid and/or steam reach their designated ring portion, the fluid and/or steam enter the cavity between the first inner ring and the second outer ring of their designated ring portion. At the cavity, the fluid and/or steam reach the corrugated sheet of their designated ring portion, which imparts pressure to the fluid or steam passing through the cavity, causing the pressurized fluid or steam to exit through the plurality of apertures 210 onto the steam wand at the center of the ring portion 204. The pressurized fluid and/or steam exiting the plurality of apertures 210 remove any unwanted milk residues that may be stuck to the steam wand. Lifting and lowering the steam wand treating device 200 along the steam wand, using gripping portion 202, ensures the full cleaning of any unwanted milk residues.

The first liquid ring portion 206 and a second steam ring portion 208 can be operated either simultaneously or sequentially.

FIGS. 5A and 5B are perspective views of the steam wand treating device 300. The device 300 is similar in construction and operation to device 100, as detailed above, except where indicated. The steam wand treating device 300 is, for example, incorporated into a standard coffee machine 302 and includes a gripping portion 304 connected to a ring portion 306. The ring portion 306 encircles a steam wand 310 and features a plurality of apertures 308 shaped to allow the exit of fluids. The apertures 308 go along the entire inner circumference of the ring portion 306 in a symmetric pattern.

The steam wand treating device 300 further includes a crumpled sheet 312 extending around the periphery of the ring portion 306. The top side of the crumpled sheet 312 is fixed to the coffee machine 302 using, for example, a magnet.

The gripping portion 304 includes a tube (not shown) connected to the coffee machine's 302 fluid container so as to transfer fluid, for example, water from the container into the ring portion 306. The tube is controlled by a valve (not shown), for example, a spring valve, a pressed valve, etc. positioned on the gripping portion 304.

In operation, the device 300 is pulled down from a first initial position 320 (FIG. 5A) to a second distal position 322 (FIG. 5B) using the gripping portion 304. During the pulling of the gripping portion 304, the crumpled sheet 312 is deployed downwards while pressurized fluid exits the plurality of apertures 308 removing any unwanted milk residues that may be stuck to the steam wand. The deployment of the crumpled sheet 312 creates a sterile environment for the cleaning, disinfecting and sterilizing of the steam wand 310.

The embodiment described in relation to FIGS. 5A and 5B is also operative with the steam wand treating device 200, as disclosed in relation to FIG. 3, replacing the steam wand treating device 100.

FIGS. 6A, 6B, 6C and 6D are perspective views of the steam wand treating device 400. The device 400 is, for example, a chamber incorporated into a standard coffee machine 402. The chamber includes a rear wall 403, oppositely disposed lateral walls 406 and 408 and a movable door 404 positioned between the lateral walls and configured to move from an open position to a closed position and vice versa. The chamber further features one or more sets of apertures 410a-410b including a pattern of a plurality of apertures arranged in a column. The apertures are shaped to allow the exit of fluids and/or steam.

The sets of apertures 410a-410b are connected to a first tube (not shown) connected to the coffee machine's 402 fluid container so as to transfer fluid, for example, water from the container, and to a second tube (not shown) connected to the coffee machine's boiler so as to transfer steam, for example, water vapor from the boiler.

In operation, once a steam wand cleanup is needed, the steam wand 412 moves from a first position (FIG. 6A), outside the chamber 400, to a second position (FIG. 6B), inside the chamber 400, using, for example, a motor (not shown). As the steam wand reaches the second position, the chamber's door closes and treating agent, such as fluid and/or steam exit the sets of apertures 410a-410b onto the steam wand 412 at the center of chamber 400 (FIG. 6C). The fluid and/or steam exiting the sets of apertures 410a-410b remove any unwanted milk residues that may be stuck to the steam wand.

Once the process is completed, the chamber's door opens and the steam wand 412 moves back from the second position, inside the chamber 400, to the first position, outside the chamber 400, for further use (FIG. 6D).

While the invention has been described with respect to a limited number of embodiments, it will be appreciated that many variations, modifications and other applications of the invention may be made. Therefore, the claimed invention as recited in the claims that follow is not limited to the embodiments described herein.

The invention claimed is:

1. A device for treating a steam wand comprising:
   a gripping portion having at least one tube configured to transfer a treatment agent that will clean the steam wand from outside;
   a ring portion in communication with said gripping portion configured to encircle said steam wand and receive said treatment agent, said ring portion includes an inner ring and an outer ring defining a cavity containing a corrugated sheet; and,
   a plurality of apertures positioned on said inner ring configured to present said treatment agent onto said steam wand.

2. The device of claim 1, wherein said at least one tube is controlled by a valve.

3. The device of claim 1, wherein said treatment agent is steam.

4. The device of claim 1, wherein said treatment agent is water.

5. The device of claim 1, wherein said ring portion includes a first ring portion and a second ring portion in communication with one another, said first ring portion configured to present a first treatment agent and said second ring portion configured to present a second treatment agent.

6. The device of claim 1, wherein said cavity includes a plurality of ring-shaped portions wherein every two ring-shaped portions of said plurality of ring-shaped portions include the corrugated sheet between them.

7. The device of claim 1, wherein said device is incorporated into a standard coffee machine.

8. The device of claim 7, wherein said device includes a crumpled sheet extending around said ring portion.

9. The device of claim 1, wherein the corrugated sheet is configured for imparting pressure to fluid passing through the cavity.

* * * * *